United States Patent [19]

Kenney

[11] 4,243,089
[45] Jan. 6, 1981

[54] PLUGS COMPOSED OF TWO RUBBERS HAVING DIFFERENT MODULI OF EXTENSION USED FOR REPAIRING PNEUMATIC TIRES

[75] Inventor: Michael J. Kenney, Sutton Coldfield, England

[73] Assignee: Dunlop Limited, London, England

[21] Appl. No.: 55,778

[22] Filed: Jul. 9, 1979

[51] Int. Cl.³ .................... B32B 7/02; B32B 25/04; B60C 21/06; B60C 25/16
[52] U.S. Cl. ............................... 152/370; 81/15.7; 156/293; 156/303.1
[58] Field of Search ............. 152/370; 156/293, 303.1; 81/15.7

[56] References Cited

U.S. PATENT DOCUMENTS

| 581,641 | 4/1897 | Wolf | 152/370 |
|---|---|---|---|
| 821,041 | 5/1906 | Kinney | 152/370 |
| 1,653,499 | 12/1927 | Fisher | 152/370 |
| 2,866,494 | 12/1958 | Sanderson | 152/370 |
| 3,029,671 | 4/1962 | Clifford | 152/370 |
| 3,542,614 | 11/1970 | Hopkins | 152/370 |
| 3,648,750 | 3/1972 | Felden | 152/370 |
| 3,773,097 | 11/1973 | Mullins | 152/370 |

FOREIGN PATENT DOCUMENTS 770568  3/1957  United Kingdom ............... 152/370

Primary Examiner—James C. Cannon
Attorney, Agent, or Firm—Stevens, Davis, Miller & Mosher

[57] ABSTRACT

A repair plug comprises an elongate body having a head and a tail made of rubber compositions having different moduli of extension. The head has a higher modulus of extension than the tail and is adapted for engagement by a repair tool. The head may have a hole adjacent the free end thereof in which a member of a repair tool is received to allow insertion of the plug in a puncture hole without folding back on itself.

Preferably the head is tapered in the direction leading towards the free end thereof and is made of a rubber composition the hardness of which exceeds that of the tail thereby further facilitating insertion.

21 Claims, 6 Drawing Figures

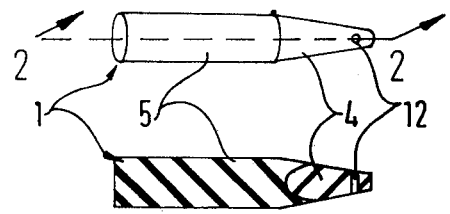
FIG.1
FIG.2
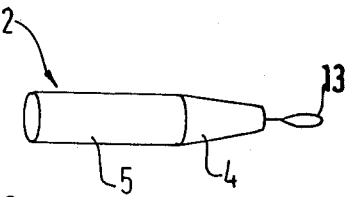
FIG.3
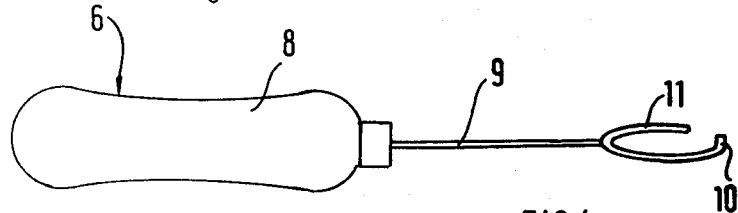
FIG.4
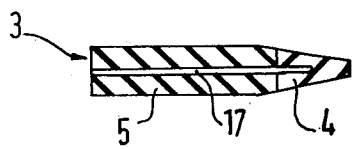
FIG.5
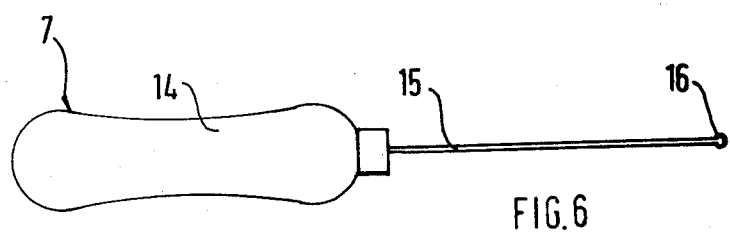
FIG.6

PLUGS COMPOSED OF TWO RUBBERS HAVING DIFFERENT MODULI OF EXTENSION USED FOR REPAIRING PNEUMATIC TIRES

This invention concerns improvements in or relating to repair plugs for pneumatic tires.

Tread punctures in pneumatic tires can often be repaired by a cylindrical plug positioned in the puncture hole by means of a suitable tool which is subsequently removed leaving a portion of the plug filling the puncture hole. The diameter of the plug is greater than the diameter of the puncture hole so that the plug is retained in the puncture hole under compression and is bonded to the wall of the puncture hole by means of a suitable bonding agent. The portion of the plug protruding above the tread surface is cut-off flush with the tread surface to complete the repair.

One conventional method of positioning the plug comprises engaging an end portion of the plug with the openeye of a needle-like tool and pushing the end portion through the puncture hole.

A disadvantage of this method is that the leading end portion of the plug folds back on the remaining portion as the plug is inserted and considerable force is required to insert and subsequently to push the folded plug sufficiently through the puncture hole to release the leading end portion from the constraint of the puncture hole. Furthermore it is often necessary to increase the size of the hole before the plug can be inserted. This operation is both difficult, particularly where the tire has steel tread reinforcements, and time consuming.

According to one aspect of the present invention a repair plug for a pneumatic tire comprises an elongate body portion having two components being rubber compositions having different moduli of extension, the component of higher modulus being adapted to be engaged by a repair tool so as to allow insertion of the plug singly through a hole in a pneumatic tire.

By the phrase "insertion of the plug singly through the hole" we mean the plug does not fold back on itself as it is inserted through the hole.

Conveniently the plug comprises a head and a tail corresponding to the components of higher and lower modulus of extension respectively.

The plug head may have a hole or a loop of material e.g. textile secured thereto and the repair tool is provided with a member e.g. a prong engageable with the hole or loop to allow the plug to be pushed through the hole in the tire.

Preferably the hole or loop is provided at or adjacent to the free end of the head so that there is no tendency for the plug to fold back on itself as it is pushed through the hole in the tire.

Alternatively the plug may have a blind bore extending axially through the tail and terminating in the head and the repair tool is provided with a member e.g. a needle which can be inserted into the bore so that the tip engages the end of the bore to allow the plug to be pushed through the hole.

Preferably the bore terminates adjacent to the free end of the head so that there is no tendency for the plug to fold back on itself as it is pushed through the hole. Preferably the tip of the needle or similar member is blunt, e.g. the tip may be flat or rounded, to prevent the tip piercing the plug head.

Preferably the plug is cylindrical and the tail has a maximum diameter corresponding to the maximum diameter of the plug and the head is tapered in the direction leading towards the free end thereof.

Preferably the tail has a greater axial length than the head.

Suitable rubber compositions for the components of the plug are those having the ranges of hardness set out in Table 1 and moduli of extension set out in Table 2.

TABLE 1

| Plug component | hardness degrees Shore A |
|---|---|
| head | 50–75 |
| tail | 30–50 |

TABLE 2

| Plug component | modulus of extension MPa | | |
|---|---|---|---|
| | 100% extn. | 200% extn. | 300% extn. |
| head | 1.5–3.5 | 4.0–8.0 | 10.0–18.0 |
| tail | 0.3–1.5 | 0.8–2.5 | 1.2–4.0 |

Preferably the plug has an elongation at break of at least 450% and more preferably at least 700%.

The rubber compositions may comprise natural or synthetic rubber or mixtures thereof and may include any of the conventional additives e.g. fillers to give the required hardness and modulus of extension as set out in the above Tables.

According to a further aspect of the present invention a method of repairing a hole in a pneumatic tire comprises engaging with a repair tool a repair plug having two components being rubber compositions having different moduli of extension, the engagement being with the component of higher modulus of extension and inserting the plug from externally of the tire singly through the hole and then removing the tool, the method including the step of applying a bonding solution to the repair plug and/or to the wall of the hole. The bonding solution is of a composition which acts as a lubricant to facilitate insertion of the plug and subsequently bonds the plug to the wall of the hole and also seals the plug relative to the wall of the hole. For example the bonding solution may comprise a vulcanisable rubber composition which vulcanises at ambient temperatures in a predetermined period of time.

Preferably the bonding solution is applied to the plug and to the wall of the hole. The bonding solution may be applied to the wall of the hole by means of a rasp or similar tool which also serves both to increase the size of very small holes and to smooth the wall of the hole.

In use of the repair plug according to the present invention insertion of the plug is facilitated by the construction of the plug which is such that when inserted through the hole there is no tendency for the leading end portion of the plug to fold back on itself. Resistance to insertion of the plug is therefore reduced and less force is required to position the plug as compared with the aforedescribed prior art plugs which fold back on themselves during insertion. Insertion of the plug is further facilitated by making the head or leading end of the plug tapered towards the free end thereof and also of increased hardness as compared with the tail of the plug.

As the plug is pushed through a puncture hole the tail stretches i.e. decreases in diameter. This together with the increased ease of insertion means that for a given maximum plug diameter the plug according to the present invention can be used to repair smaller puncture holes than the conventional plug without having to first increase the size of the puncture hole. The plug according to the present invention is therefore particularly suitable for repairing tires fitted to the wheel rim in particular those having steel tread reinforcements e.g. run-flat tires.

Similarly for a given size of puncture hole a larger size of plug according to the present invention can be used as compared with a conventional plug. An advantage of being able to use a larger plug is that the compression of the plug in the puncture hole is greater and the possibility of the plug working its way out of the puncture hole or not completely sealing the puncture hole are rendered.

According to yet a further aspect of the present invention we provide a repair kit for repairing a hole in a pneumatic tyre comprising a repair plug having two components being rubber compositions having different moduli of extension, a bonding solution for bonding the plug to the wall of the hole and a repair tool engageable with the plug component of higher modulus of extension to allow insertion of the plug singly through the hole.

The invention will now be described in more detail, by way of example only, with reference to the accompanying drawing wherein:

FIG. 1 is a perspective view of one embodiment of a repair plug according to the present invention;

FIG. 2 is a section on the line 2—2 of FIG. 1;

FIG. 3 is a perspective view of a second embodiment of a repair plug according to the present invention;

FIG. 4 is a side elevation of a repair tool suitable for use with the repair plugs shown in FIGS. 1, 2 and 3;

FIG. 5 is a longitudinal cross-section of a third embodiment of a repair plug according to the present invention; and FIG. 6 is a side elevation of a repair tool suitable for use with the repair plug shown in FIG. 5.

The repair plugs 1, 2 and 3 shown in FIGS. 1, 2 3 and 5 of the accompanying drawing are similar and like reference numerals are used to indicate corresponding parts. Each plug 1, 2, 3 comprises an elongate cylindrical body tapered at one end to form a head 4 of length about 12 mm and a tail 5 of length about 20 mm. The head and tail are made from rubber compositions having the following hardnesses and moduli of extension.

|  | hardness | modulus of extension (MPa) | | |
|---|---|---|---|---|
|  | (degrees Shore A) | 100% extn. | 200% extn. | 300% extn. |
| head | 65 | 2.5 | 6.0 | 14.0 |
| tail | 37 | 0.7 | 1.5 | 2.0 |

The tail 5 has a maximum diameter of 7 mm corresponding to the maximum diameter of the plug and the head 4 is tapered in the direction leading towards the free end thereof to a minimum diameter of 4 mm at the free end. The end of the tail connected to the head is also slightly tapered to provide a gradual transition between the head and tail. This ensures a gradual change of modulus at the juncture between the components of the head and tail.

The plugs 1 and 2 (FIGS. 1, 2 and 3) are adapted for engagement with a repair tool 6 shown in FIG. 4 and the plug 3 (FIG. 5) is adapted for engagement with a repair tool 7 shown in FIG. 6.

The repair tool 6 has a handle 8 in which is fitted a needle 9 with an open eye 10 and a prong 11. The plug 1 is formed with a transversely extending hole 12 of 1 mm diameter adjacent to the free end of the plug head 4 in which the prong 11 is received. The plug 2 is provided with a loop 13 of textile material secured to the free end of the plug head 4 in which the prong 11 is received.

The repair tool 7 has a handle 14 in which is fitted a needle 15 having an enlarged rounded end 16. The plug 3 is formed with a blind bore 17 extending in the axial direction of the plug through the tail 5 and terminating in the head 4. The needle 15 is received in the bore 17 so that the enlarged end 16 abuts the end of the bore in the head 4.

In each case the engagement of the repair tool 6, 7 is with the plug head i.e. the component having the higher modulus of extension.

In use the repair plugs 1, 2 and 3 are used to repair a puncture hole in a pneumatic tire fitted on the wheel rim by:

(a) inserting a rasp coated with bonding solution into the puncture hole and working the rasp about within the hole;

(b) engaging the plug with the appropriate repair tool;

(c) coating the plug with bonding solution;

(d) inserting the free end of the plug head into the hole;

(e) pushing the repair plug singly through the hole, the head and tail being able to stretch as the plug is drawn into the hole;

(f) retracting the repair tool when the plug is in position, the tail expanding to fill the hole; and (g) cutting off any excess length of plug projecting above the tread surface.

A suitable bonding solution is one which initially acts as a lubricant to facilitate positioning of the plug and subsequently bonds the plug to the wall of the hole. For example the bonding solution may be a vulcanisable rubber solution which vulcanises at ambient temperatures over a predetermined time period. Such bonding solutions are well known in the art.

It will be apparent from the foregoing description that any tendency for the plugs 1, 2 and 3 to fold as they are pushed through the puncture hole is avoided by the construction of the plugs and their engagement with the repair tool. Thus the hole 12 and loop 13 of the plugs 1 and 2 respectively are provided adjacent to or at the free end of the plug head 4 so that no appreciable length of plug is left which could fold back. Similarly the blind bore 17 of the plug 3 terminates within the plug head 4 towards the free end thereof. In addition the force to push the plug 3 through the hole is applied along the longitudinal central axis of the plug so that lateral forces tending to make the plug fold are avoided.

The invention is not restricted to the abovedescribed embodiments which may be varied in a number of ways; for example the dimensions of the plug head and tail may be varied. The hardness and modulus of extension of the plug head and tail may be altered provided those of the head are greater than those of the tail. The hole 12 formed in the plug 1 may be inclined at angles other than 90° with respect to the longitudinal axis of the plug i.e. the hole may extend in a generally axial direction.

Finally it will be appreciated that the repair plug according to the present invention may form part of a repair kit comprising at least one or more repair plugs, a supply of bonding solution and a repair tool. Optionally a rasp or similar tool may be provided.

Having now described my invention - What I claim is:

1. A repair plug for a pneumatic tire comprises an elongate body having two components being rubber compositions having different moduli of extension, the component of higher modulus being adapted to be engaged by a repair tool so as to allow insertion of said plug singly through a hole in a pneumatic tire.

2. A repair plug according to claim 1 in which said two plug components comprise a head and a tail respectively of which said head has a higher modulus of extension than said tail.

3. A repair plug according to claim 2 wherein said head has a hole in which a prong of a repair tool is received in use of the plug.

4. A repair plug according to claim 2 in which said hole is provided adjacent to the free end of said head.

5. A repair plug according to claim 3 in which said hole extends in a direction transverse to the longitudinal axis of said plug.

6. A repair plug according to claim 2 in which said head has a loop of material secured thereto in which a prong of a repair tool is received in use of the plug.

7. A repair plug according to claim 6 in which the loop of material is provided at the free end of the plug head.

8. A repair plug according to claim 2 in which said plug has a blind bore extending in the axial direction of the plug through said tail and terminating in said head.

9. A repair plug according to claim 8 in which said bore terminates adjacent to the free end of said head.

10. A repair plug according to claim 2 in which said plug is cylindrical and said tail has a maximum diameter corresponding to the maximum diameter of said plug.

11. A repair plug according to claim 10 in which said head is tapered in a direction leading towards the free end thereof.

12. A repair plug according to claim 2 in which the hardness of the rubber composition of said head exceeds that of the rubber composition of said tail.

13. A repair plug according to claim 12 in which the rubber composition of said head has a hardness in the range 50 to 75 degrees Shore A and the rubber composition of said tail has a hardness in the range 30 to 50 degrees Shore A.

14. A repair plug according to claim 2 in which said head and tail have moduli of extension in the ranges 1.5 to 3.5 MPa and 0.3 to 1.5 MPa respectively at 100% extension, 4.0 to 8.0 MPa and 0.8 to 2.5 MPa respectively at 200% extension and 10.0 to 18.0 MPa and 1.2 to 4.0 MPa respectively at 300% extension.

15. A repair plug according to claim 1 in which said plug has an elongation at break of at least 450%.

16. A repair plug according to claim 15 in which said plug has an elongation at break of at least 700%.

17. A repair kit for repairing a pneumatic tyre comprising a repair plug according to claim 1, a bonding solution and a repair tool engageable with said plug to allow insertion of said plug singly through a hole in a pneumatic tire.

18. A method of repairing a hole in a pneumatic tire comprises engaging with a repair tool a repair plug having two components being rubber compositions having different moduli of extension, the engagement being with the component of higher modulus of extension and inserting said plug from externally of the tire singly through said hole and then removing said tool, the method including the step of applying a bonding solution to said repair plug.

19. A method according to claim 18 in which said bonding solution is applied to the wall of said hole.

20. A method of repairing a hole in a pneumatic tire comprises engaging with a repair tool a repair plug having two components being rubber compositions having different moduli of extension, the engagement being with the component of higher modulus of extension, applying a bonding solution to the wall of said hole and inserting said plug from externally of the tire singly through said hole and then removing said tool.

21. A method according to claim 20 in which said bonding solution is applied to said plug.

* * * * *